(No Model.)

R. H. HURLBUT.
TOOL REST FOR LATHES.

No. 301,994. Patented July 15, 1884.

Witnesses:
James H Williams
William G. Smith

Inventor:
Rufus H. Hurlbut
per Stephen Moore
Atty

UNITED STATES PATENT OFFICE.

RUFUS H. HURLBUT, OF SUDBURY, MASSACHUSETTS.

TOOL-REST FOR LATHES.

SPECIFICATION forming part of Letters Patent No. 301,994, dated July 15, 1884.

Application filed September 24, 1883. (No model.)

*To all whom it may concern:*

Be it known that I, RUFUS H. HURLBUT, of Sudbury, in the county of Middlesex and State of Massachusetts, have invented a new and useful Improvement in Tool-Rests for Lathes, of which the following is a specification.

My invention relates to that class of lathes which are adapted to cut off shafting or similar metallic rods, and to that class of tool-rests used thereon which are adapted to support two tools to operate simultaneously upon opposite sides of a shaft to be cut off, and is an improvement upon the invention patented to E. Elliott, April 12, 1881, No. 239,945. The machine described in that patent has two tool-posts mounted upon the same carriage, and adapted to be moved thereon in opposite directions at the same time by the revolution of a right-and-left hand screw-rod. It is found in practice that in the use of this mechanism in cutting off shafting nice adjustment of the tools is necessary in order that each may do its proper share of the work; and the object of my invention is to provide means for adjusting one tool without disturbing the other, which I accomplish by connecting the screw-rod to one of the tool-posts by means of a nut by the revolution of which the necessary adjustment may be made.

Figure 1:
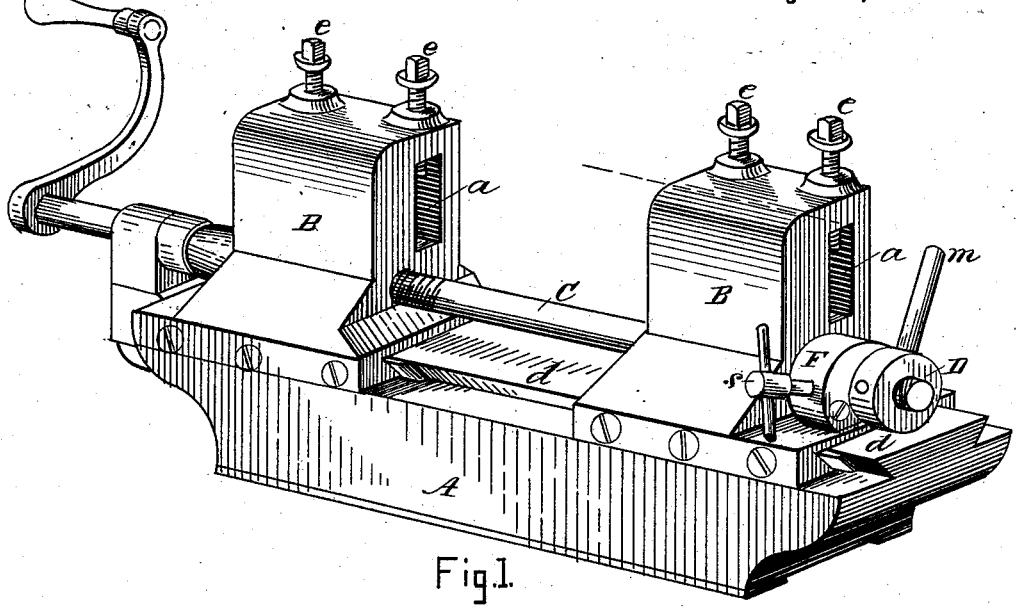
Figure 2:
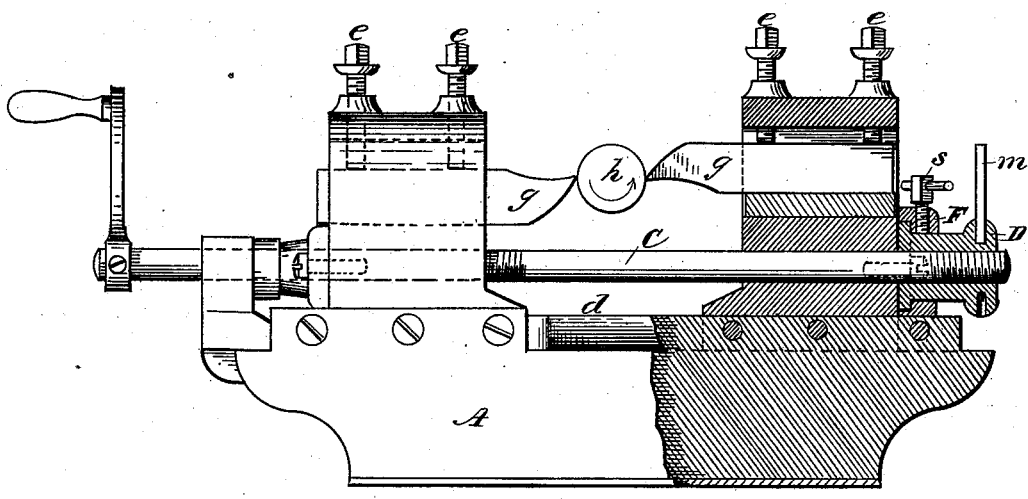

In the drawings, Figure 1 is a perspective of a tool-rest involving my invention; Fig. 2, an elevation of the same, partly in section.

Similar letters refer to like parts in each.

A is a tool-carriage, which may or may not be adapted to slide transversely upon a lathe-bed.

B B are tool-posts, each adapted to receive a tool, $g$, Fig. 2, to be held in the slot $a$ by the set-screws $e\ e$, in such position as to operate upon opposite sides of the shaft $h$. These tool-posts are arranged to slide upon the carriage A, being mounted upon the dovetailed projection $d$, and are moved thereon by the screw-rod C, which is connected with one by a right and the other by a left hand screw-thread, so that the revolution of such rod causes the tool-posts to move in opposite directions, and simultaneously approach or recede from a shaft, $h$, being operated upon.

My invention particularly relates to the connection of the screw-rod C with one of the tool-posts. (Seen on the right in the drawings.) Instead of being screwed directly upon the rod C, this post carries a collet, F, made fast to it, which is cut away on its inside next the post, so as to inclose the flange of a circular nut, D, in such a manner that, while the nut is always held snug against the face of the post, it may still be revolved in the socket thus provided for it, as plainly shown in the sectional view in Fig. 2. When it is not desired that the nut should turn, it may be held by screwing the set-screw $s$, passing through the collet, against it.

Instead of the screw-rod C being threaded in the tool-post last mentioned, it passes loosely through it, and is threaded in the nut D, which may be revolved by the lever $m$, and thus serve to make any desired adjustment of one tool-post without disturbing the other. Both tool-posts may be thus arranged, if desired; but in practice I have found that any inequality in the cut of the two tools operating upon a shaft can be corrected by the use of one such adjusting-nut, as described.

I claim—

1. In a machine for cutting off shafting, the combination of two tools adapted to be fed to the work upon opposite sides thereof by one and the same movement of an operative mechanism, and means for adjusting one of such tools to the work independent of the joint operating mechanism, substantially as herein set forth.

2. In a machine for cutting off shafting, the combination of the tool-carriage A, the sliding tool-posts B B, each carrying an adjustable tool, $g$, and operated by the right-and-left screw C, and the adjusting-nut D, arranged and to operate substantially as shown and described.

3. In combination with the sliding tool-post B, operated by a screw-rod, the nut D and collet F, arranged substantially as specified.

RUFUS H. HURLBUT.

Witnesses:
STEPHEN MOORE,
JAMES H. WILLIAMS.